United States Patent
Sun (10) Patent No.: US 9,621,461 B2
(45) Date of Patent: Apr. 11, 2017

(54) MEDIA ACCESS CONTROL (MAC) ADDRESS TABLE PROTECTION IN A VIRTUALIZED COMPUTING ENVIRONMENT

(71) Applicant: VMware, Inc., Palo Alto, CA (US)

(72) Inventor: Keyong Sun, Beijing (CN)

(73) Assignee: VMware, Inc., Palo Alto, CA (US)

( * ) Notice: Subject to any disclaimer, the term of this patent is extended or adjusted under 35 U.S.C. 154(b) by 72 days.

(21) Appl. No.: 14/606,034

(22) Filed: Jan. 27, 2015

(65) Prior Publication Data

US 2016/0218972 A1 Jul. 28, 2016

(51) Int. Cl.
*H04L 12/741* (2013.01)
*H04L 29/12* (2006.01)
*G06F 9/455* (2006.01)

(52) U.S. Cl.
CPC .............. *H04L 45/74* (2013.01); *G06F 9/455* (2013.01); *G06F 9/45558* (2013.01); *H04L 45/54* (2013.01); *H04L 61/2596* (2013.01); *H04L 61/6022* (2013.01); *G06F 2009/45595* (2013.01); *H04L 61/103* (2013.01); *H04L 61/2015* (2013.01); *H04L 61/2525* (2013.01)

(58) Field of Classification Search
USPC .......................................................... 370/392
See application file for complete search history.

(56) References Cited

U.S. PATENT DOCUMENTS

| | | | |
|---|---|---|---|
| 8,166,187 B2 * | 4/2012 | Gowda | H04L 12/66 370/219 |
| 9,037,719 B2 | 5/2015 | Shen et al. | |
| 9,286,047 B1 * | 3/2016 | Avramov | G06F 8/61 |
| 2005/0076145 A1 * | 4/2005 | Ben-Zvi | H04L 29/12009 709/245 |
| 2008/0005329 A1 * | 1/2008 | Bauman | H04L 29/12207 709/226 |
| 2008/0080496 A1 * | 4/2008 | Slaight | H04L 29/12584 370/389 |
| 2008/0219273 A1 * | 9/2008 | Kaneko | H04L 45/00 370/401 |
| 2010/0162241 A1 * | 6/2010 | Koma | H04L 29/12283 718/1 |
| 2011/0299386 A1 * | 12/2011 | Negoto | H04L 45/28 370/221 |

(Continued)

*Primary Examiner* — Edan Orgad
*Assistant Examiner* — Emmanuel Maglo
(74) *Attorney, Agent, or Firm* — Su IP Consulting (57) ABSTRACT

An example method is provided for a network device to protect a Media Access Control (MAC) address table of a network switch in a virtualized computing environment. The method may comprise, in response to receiving a request message from a virtual machine, determining a shared MAC address that is usable for the virtual machine and at least one other virtual machine, modifying a source MAC address of the request message from a MAC address associated with the virtual machine to the shared MAC address; and sending, to the network switch, the request message having the shared MAC address as the modified source MAC address. The method may comprise, in response to receiving a reply message from the network switch, the reply message having the shared MAC address as a destination MAC address, sending, to the virtual machine, the reply message in reply to the request message.

20 Claims, 9 Drawing Sheets

(56) References Cited

U.S. PATENT DOCUMENTS

| | | | |
|---|---|---|---|
| 2012/0246282 A1* | 9/2012 | Oguchi | H04L 12/66 709/221 |
| 2013/0086259 A1* | 4/2013 | Yu | H04L 12/66 709/224 |
| 2013/0336317 A1* | 12/2013 | Mithyantha | H04L 45/586 370/390 |
| 2015/0043581 A1* | 2/2015 | Devireddy | H04L 49/70 370/392 |
| 2015/0052262 A1* | 2/2015 | Chanda | H04L 61/2015 709/245 |
| 2015/0052522 A1* | 2/2015 | Chanda | G06F 9/455 718/1 |
| 2015/0186174 A1* | 7/2015 | Borkmann | G06F 9/45558 718/1 |
| 2016/0105393 A1 | 4/2016 | Thakkar et al. | |

* cited by examiner

| Hardware Type (HTYPE) 410 | Protocol Type (PTYPE) 420 |
|---|---|
| Hardware Address Length (HLEN) 430 / Protocol Address Length (PLEN) 440 | Operation (OPER) (1 = ARP request, 2 = ARP reply) 450 |
| Source Hardware Address (SHA)* 460 | |
| Source Protocol Address (SPA) 470 | |
| Target Hardware Address (THA)** 480 | |
| Target Protocol Address (TPA) 490 | |

\* Modified in ARP request
\*\* Modified in ARP reply

MEDIA ACCESS CONTROL (MAC) ADDRESS TABLE PROTECTION IN A VIRTUALIZED COMPUTING ENVIRONMENT

BACKGROUND

Unless otherwise indicated herein, known approaches described are not admitted to be prior art by inclusion throughout the present disclosure.

In a communications network, a network switch may perform Media Access Control (MAC) address learning to facilitate communication among network devices (e.g., hosts). For example, when a message is received from a network device, the network switch may store, in a MAC address table, a source MAC address of the message in association with a port via which the message is received. When a response addressed to the stored MAC address is received, the network switch may rely on the MAC address table to determine the port via which the response should be forwarded on. This way, the network switch may dynamically build a MAC address table as new MAC addresses are learned from various messages. However, the size of the MAC address table is generally limited, which means the number of MAC addresses that may be learned is also limited.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

When a Media Access Control (MAC) address table at a network switch is full, there is no capacity for the network switch to learn new MAC addresses. In this case, the network switch may enter into a fail-open mode, where messages with an unknown destination MAC address will be broadcasted. For example, when a unicast packet arrives and its destination MAC address is not found in its MAC address table, the network switch will send the unicast packet to all ports, except to the port via which the unicast packet is received. This is generally known as an unknown unicast flood because the unicast packet is treated as a broadcast packet. This flooding problem may persist until one or more entries in the MAC address table are aged out.

In a legacy network environment, the risk of the MAC address table overflowing is relatively low because the number of physical network devices connecting to the network switch is limited by the number of ports at the network switch. However, in a virtualized computing environment (e.g., data center), a network switch may be connected to a very large number of virtual machines due to the virtualization of physical network devices. In this case, there is a greater risk of the MAC address table at the network switch overflowing, which degrades network performance. As will be explained below, it is therefore desirable to protect the MAC address table at the network switch to reduce the likelihood of an overflow.

Figure 1:
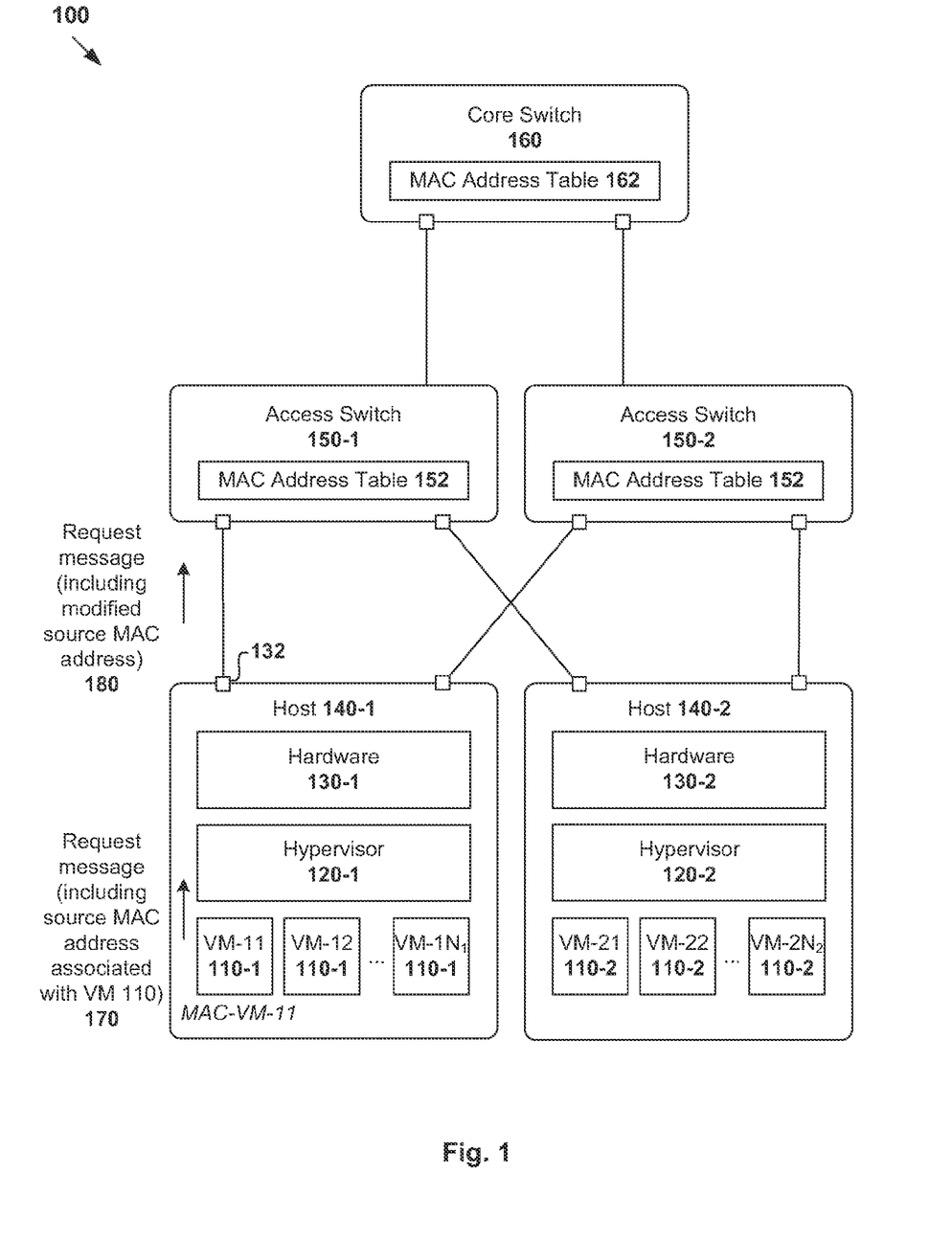
FIG. 1 is a schematic diagram of an example virtualized computing environment in which Media Access Control (MAC) address table protection may be implemented.

FIG. 1 is a schematic diagram of example virtualized computing environment 100 in which MAC address table protection may be implemented. Although an example is shown, it will be appreciated that virtualized computing environment 100 may include additional or alternative components. In the example in FIG. 1, virtualized computing environment 100 includes multiple physical network devices (e.g., hosts 140-1 and 140-2) that are connected to network switches in the form of access switches 150-1 and 150-2, and core switch 160.

Through virtualization, resources of each host 140-1/140-2 may be pooled together to support multiple virtual machines. For example, host 140-1 includes suitable hardware 130-1 and hypervisor 120-1 to support multiple virtual machines 110-1 (e.g., VM-11, VM-12 to VM-1N$_1$). Similarly, host 140-2 includes hardware 130-2 and hypervisor 120-2 to support multiple virtual machines 110-2 (e.g., VM-21, VM-22 to VM-1N$_2$). In the rest of the specification, hosts 140-1 and 140-2 may be collectively referred as "hosts 140" or individually as a general "host 140"; hardware 130-1 and 130-2 as "hardware 130"; hypervisors 120-1 and 120-2 as "hypervisors 120" or "hypervisor 120"; and virtual machines 110-1 and 110-2 as "virtual machines 110" or "virtual machine 110."

Throughout the present disclosure, the term "virtual machine" may refer generally to an isolated user space instance such as a virtual machine running within a virtualized computing environment (e.g., FIG. 1). Although virtualized computing environment 100 is used as an example here, other technologies aside from hardware virtualization may be used to provide isolated user space instances. For example, virtual machines 110 in FIG. 1 may be containers, virtual private servers, etc. In another example, virtual machines 110 may be complete computation environments, containing virtual equivalents of the hardware and system software components of a physical system.

Conventionally, in the example in FIG. 1, access switch 150 maintains MAC address table 152 to learn new MAC addresses in messages received from virtual machines 110 via host 140. For example, when a message from virtual machine 110 (e.g., VM-11) is received, access switch 150 may store the message's source MAC address, which is the MAC address of virtual machine 110 (e.g., MAC-VM-11), in MAC address table 152. This is repeated for other MAC addresses, such as MAC-VM-12 of VM-12, MAC-VM-21 for VM-21, etc. Similarly, core switch 160 maintains MAC address table 162 that is dynamically updated to store unknown MAC addresses as messages from virtual machines 110 are received.

Any suitable number of hosts 140 (denoted M) may be connected to access switch 150, with hypervisor 120 of each host 140 supporting any suitable number of virtual machines 110 (denoted $N_M$). For simplicity, the case of M=2 is illustrated in FIG. 1, with hypervisors 120-1 and 120-2 supporting $N_1$ and $N_2$ virtual machines 110, respectively. However, in practice, each access switch 150 may be connected to tens or hundreds of hosts 140 (e.g., up to 16 connections) and each host 140 may support hundreds of virtual machines 110 (e.g., up to 1024 connections). Further, core switch 160 may be connected to other access switches 150 (e.g., up to 48 connections) not shown in FIG. 1 to form a larger network that covers different geographical locations.

As such, conventionally, access switch 150 and core switch 160 may have to learn the MAC address of a very large number of virtual machines 110. If virtual machines 110 send a large number of messages (e.g., some with invalid source MAC addresses), MAC address table 152/162 might be filled up quickly, increasing the risk of the table overflowing and the above flooding problem in virtualized computing environment 100. The problem of the table 152/162 overflowing is generally more crucial at core switch 160 compared to access switch 150 due to the larger number of virtual machines 110 (indirectly) connected to core switch 160. A significantly larger MAC address table 152/162 may be used, but as size of the table 152/162 grows, the search for MAC address becomes less efficient.

According to examples of the present disclosure, instead of relying on access switch 150 or core switch 160 to learn the MAC addresses of different virtual machines 110, host 140 may protect MAC address table 152/162 by modifying a source MAC address in a request message from virtual machine 110 (see 170 in FIG. 1). The request message with the modified source MAC address may then be sent to access switch 150 (see 180 in FIG. 1). The modified source MAC address may be a shared MAC address that is usable for multiple virtual machines 110 (e.g., VM-11 and VM-12). Here, the term "shared MAC address" may refer generally to any suitable MAC address that is usable for multiple virtual machines 110, including the virtual machine 110 (e.g., VM-11) that sent the request message and at least one other virtual machine 110 (e.g., VM-12).

Figure 2:
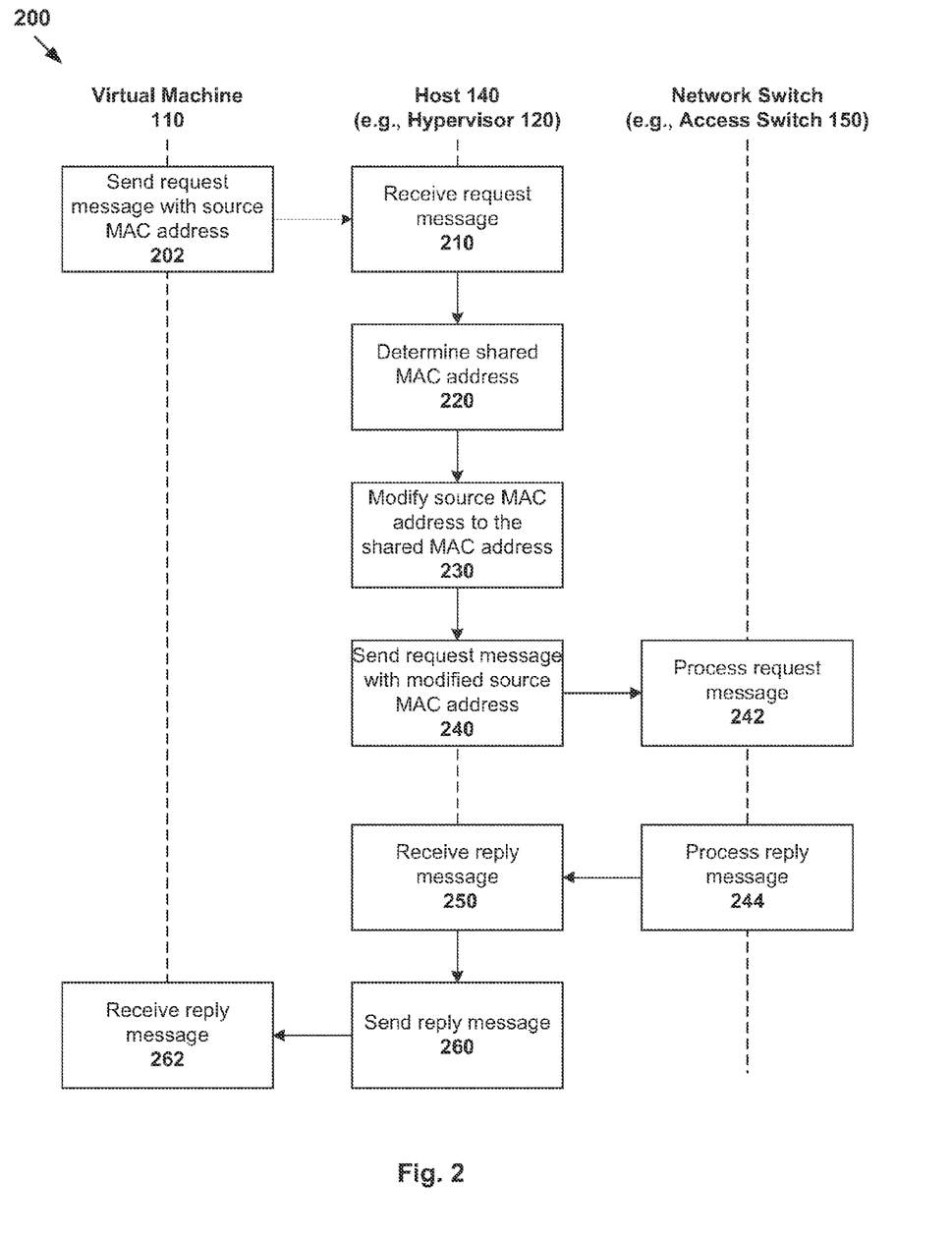
FIG. 2 is a flow chart of an example process for MAC address table protection in a virtualized computing environment.

In more detail, FIG. 2 is a flow chart of an example process 200 for MAC address table protection in virtualized computing environment 100. Example process 200 may include one or more operations, functions, or actions illustrated by one or more blocks, such as blocks 202 to 262. The various blocks may be combined into fewer blocks, divided into additional blocks, and/or eliminated based upon the desired implementation. Any suitable approach may be used to implement MAC address table protection at host 140, such as using hypervisor 120 (to be discussed further using FIG. 3) or any other suitable component of host 140. In the present disclosure, the term "hypervisor" 120 may refer generally to a virtualization software layer running on host 140 to support virtual machines 110.

At blocks 202 and 210 in FIG. 2, hypervisor 120 receives, from virtual machine 110 (e.g., VM-11), a request message having a source MAC address. Here, the term "request message" may generally refer to a message received from virtual machine 110 for forwarding to any suitable destination via access switch 150. For example, the request message may be a broadcast message (e.g., Ethernet packet) with a broadcast destination MAC address (e.g., FF:FF:FF:FF:FF:FF). In this case, since the request message is to be broadcasted, the request message may reach many access switches 150 and core switches 160. This increases the likelihood of MAC tables 152/162 overflowing if the request message is broadcasted without modifying its source MAC address.

At block 220 in FIG. 2, in response to receiving the request message, hypervisor 120 determines a shared MAC address that is usable for virtual machine 110 (e.g., VM-11) and at least one other virtual machine 110 (e.g., VM-12). Further, at block 230 in FIG. 2, hypervisor 120 modifies the source MAC address of the request message from a MAC address associated with virtual machine 110 (e.g., MAC-VM-11 associated with VM-11) to the shared MAC address. At block 240 in FIG. 2, hypervisor 120 sends the request message with the modified source MAC address (e.g., MAC-UP1) to access switch 150.

Any suitable shared MAC address may be used. For example, as will be described using FIG. 3, hypervisor 120 may connect virtual machines 110 (e.g., VM-11 and VM-12) to access switch 150 via multiple uplink interfaces (e.g., UP1 and UP2). In this case, determining the shared MAC address at block 220 may include hypervisor 120 selecting one of the uplink interfaces (e.g., UP1) and setting a MAC address associated with the selected uplink interface (e.g., MAC-UP1) to be the shared MAC address. In this case, the request message with the modified source MAC (e.g., MAC-UP1) may be sent via the selected uplink interface (e.g., UP1). In another example, the shared MAC address may be any other MAC address that is specifically configured according to the Institute of Electrical and Electronic Engineers (IEEE) standard (e.g., IEEE 802).

At block 242 in FIG. 2, access switch 150 receives and processes the request message. For example, if the shared MAC address (e.g., MAC-UP1) is unknown, access switch 150 may store an association between the shared MAC address and an interface via which the request message is received in MAC address table 152. The request message is then forwarded (e.g., to core switch 160). At block 244, access switch 150 processes a reply message having the shared MAC address as a destination MAC address. In this case, since access switch 150 has previously learned the shared MAC address, access switch 150 may rely on MAC address table 152 to find the interface via which the reply message should be sent.

At block 250 in FIG. 2, hypervisor 120 receives, from access switch 150, the reply message in reply to the request message and having the shared MAC address as the destination address. Here, the term "reply message" may generally refer to a message that is received from access switch 150 for forwarding to virtual machine 110. At blocks 260 and 262 in FIG. 2, hypervisor 120 sends the reply message to virtual machine 110 (e.g., VM-11).

Using the shared MAC address (e.g., MAC-UP1) to replace the source MAC address of request messages from different virtual machines 110 (e.g., VM-11 and VM-12), the number of MAC addresses that needs to be learned by access switch 150 or core switch 160 may be reduced. For example, when a further request message is received from another virtual machine 110 (e.g., VM-12), the same modification may be perform to replace its source MAC address (e.g., MAC-VM-12) with the shared MAC address (e.g., MAC-UP1). As such, if the shared MAC address is used for 100 different virtual machines 110, access switch 150 or core switch 160 learns one shared MAC address (e.g., MAC-UP1) instead of 100 different MAC addresses associated with different virtual machines 110.

Using example process 200, hypervisor 120 may protect MAC address table 152/162 and reduce its likelihood of overflowing. This in turn reduces the likelihood of flooding at access switch 150 or core switch 160, and the associated network performance degradation in virtualized computing environment 100. Any security problems relating the flooding problem may also be alleviated, such as the inadvertent disclosure of sensitive information during a fail-open mode.

The request and reply messages may be any suitable messages generated using any suitable protocol. For example, the request and reply messages may be Address Resolution Protocol (ARP) request and reply messages, respectively. In another example, the request message may be a Dynamic Host Configuration Protocol (DHCP) Discover message, and the reply message a DHCP Offer message. In a further example, the request message may be a DHCP Request message, and the reply message a DHCP Acknowledgement (ACK) or DHCP Negative Acknowledgement (NACK) message.

In the following, an example network device (e.g., host 140) for implementing example process 200 will be discussed with reference to FIG. 3. An implementation of example process 200 when forwarding ARP messages will be discussed with reference to FIG. 4, FIG. 5 and FIG. 6. An implementation of example process 200 when forwarding DHCP messages will be discussed with reference to FIG. 7, FIG. 8 and FIG. 9.

Hypervisor

Figure 3:
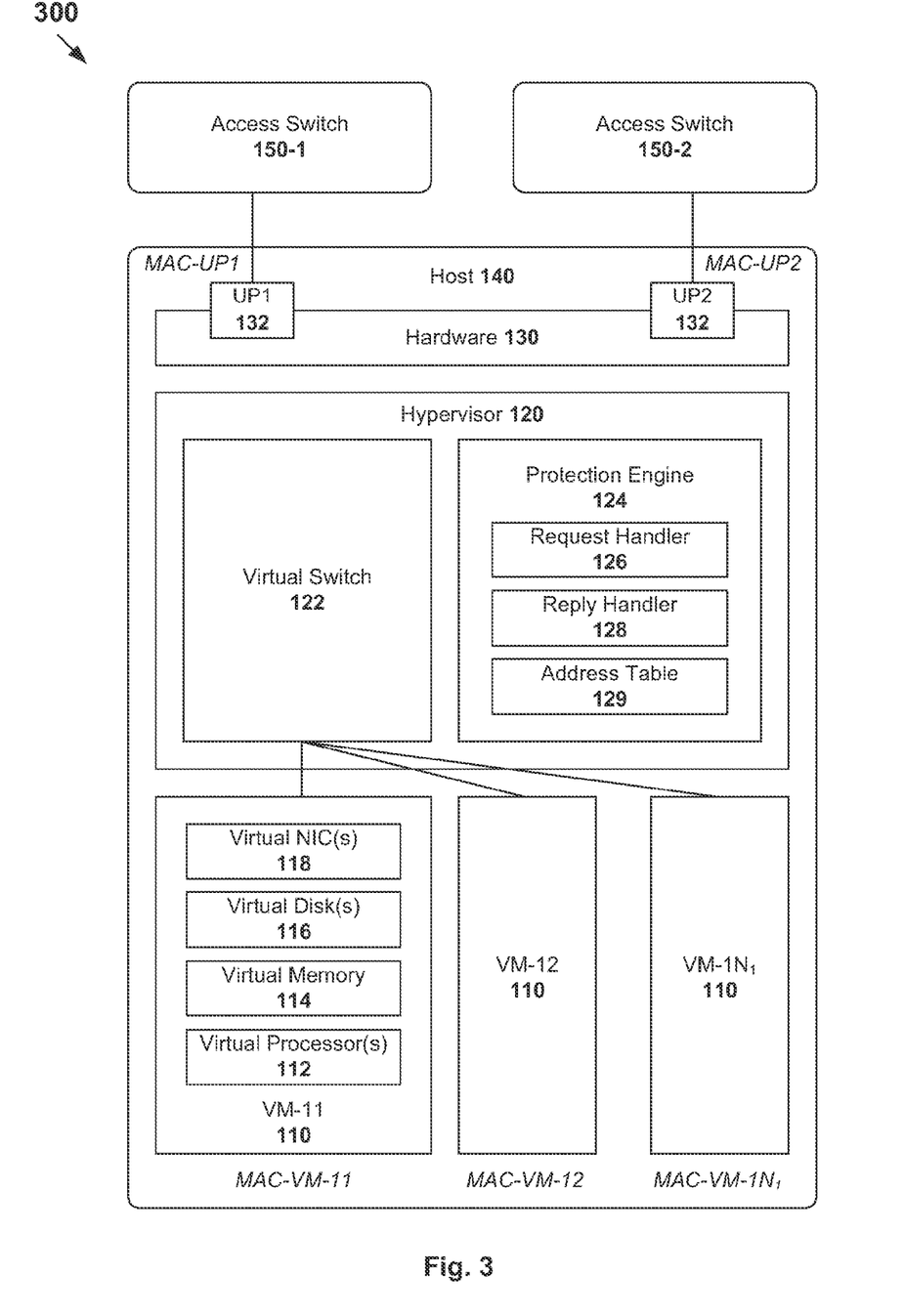
FIG. 3 is a schematic diagram of an example network device for MAC address table protection in the example virtualized computing environment in FIG. 1.

FIG. 3 is a schematic diagram of an example network device (e.g., host 140) for MAC address table protection in example virtualized computing environment 100 in FIG. 1. Although an example is shown, it will be appreciated that host 140 may include additional or alternative components.

In the example in FIG. 3, hypervisor 120 maintains a mapping between virtual resources allocated to virtual machines 110 and physical resources provided by hardware 130 of host 140. For example, virtual resources allocated to virtual machines 110 may include one or more virtual processors 112, virtual memory 114, storage resources in the form of one or more virtual disks 116, and network resources in the form of one or more virtual network interface cards (vNICs). Each vNIC generally has a unique MAC address. For simplicity, it is assumed that each virtual machine 110 has one vNIC in the examples in the present disclosure.

Hypervisor 120 may include virtual switch 122 that functions as a layer-2 switch to facilitate communication among virtual machines 110 connecting to the same hypervisor 120, as well as to other network(s) not shown in FIG. 3. In practice, virtual switch 122 may be a software implementation managed by hypervisor 120, or a hardware switch performing some or all of its functions. To send messages to access switch 150, virtual switch 122 may select one of uplink interfaces 132 (e.g., UP1 and UP2) at host 140. In practice, uplink interfaces 132 may be physical interfaces (e.g., ports) or logical interfaces (e.g., a portion of the physical interfaces) at host 140. Each uplink interface 132 is associated with a unique MAC address, such as MAC-UP1 for UP1, MAC-UP2 for UP2, etc.

To implement MAC address table protection, hypervisor 120 may include protection engine 124 with request handler 126, reply handler 128 and address table 129. For example, request handler 126 may be used to receive and process any request messages from virtual machine 110 for forwarding to access switch 150. Reply handler 128 may be used to receive and process reply messages from access switch 150 for forwarding to virtual machine 110. Request handler 126 and reply handler 128 may store any relevant address information in address table 129, for example for sending unicast reply messages (e.g., ARP reply messages) to virtual machines 110. Messages may be received and sent by request handler 126 and reply handler 128 via virtual switch 122 and uplink interface 132 (e.g., UP1).

Although protection engine 124 is shown in FIG. 3 as a separate module to virtual switch 122, virtual switch 122 may include protection engine 124 in some implementations. In other implementations, part of the functionalities provided by protection engine 124 may be implemented by virtual switch 122.

ARP Messages

Example process 200 in FIG. 2 may be implemented by hypervisor 120 when forwarding ARP messages between virtual machine 110 and access switch 150. In general, ARP is used by virtual machine 110 to look up a MAC address (i.e., layer 2 hardware address) based on an IP address (i.e., layer 3 network address). For example, consider a situation where virtual machine 110 (e.g., VM-11) wishes to send data to a destination device (e.g., Device A). However, virtual machine 110 (e.g., VM-11) knows a destination IP address (e.g., IP-A) of the destination device (e.g., Device A), but not its corresponding destination MAC address (e.g., MAC-A).

To translate the IP address (e.g., IP-A) into its corresponding MAC address (e.g., MAC-A), virtual machine 110 (e.g., VM-11) may send an ARP request message addressed to a broadcast destination MAC address (e.g., FF:FF:FF:FF:FF:FF). Each device receiving the ARP request message will then examine whether the IP address (e.g., IP-A) in the ARP request message matches with that device's IP address. If yes, the device (e.g., Device A) with the matching IP address (e.g., IP-A) will respond with an ARP reply message to inform virtual machine 110 (e.g., VM-11) of its MAC address (e.g., MAC-A). The ARP request message is a broadcast message, but the ARP reply message is generally a unicast message.

Figure 4:
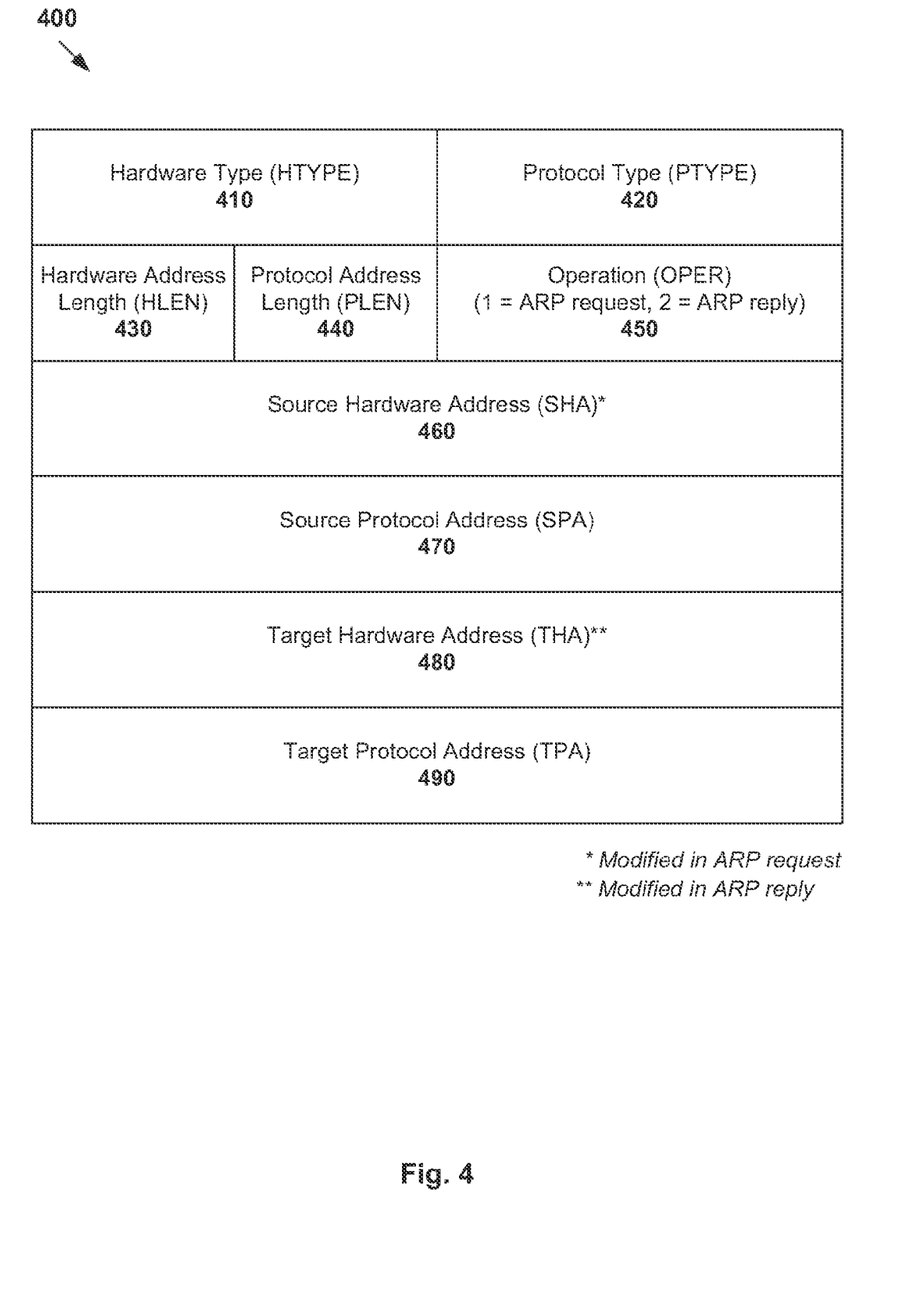
FIG. 4 is a schematic diagram of an example format of an Address Resolution Protocol (ARP) message.

FIG. 4 is a schematic diagram of an example format of ARP message 400. Although an example is shown, ARP message 400 may have additional or alternative fields. The header of ARP message 400 may include data relating to the type of hardware address (e.g., MAC address), type of network address (e.g., IP address) and the length of the addresses. At 410, hardware type (HTYPE) is to specify the type of hardware address (e.g., '1' for MAC address). At 420, protocol type (PTYPE) is to specify the type of network address (e.g., '0x0800' for IP version 4 (IPv4) address). At 430, hardware length (HLEN) is to specify the address length of the type specified in HTYPE (e.g., '6' octets for a MAC address). At 440, protocol length (PLEN) is to specify the address length of the type specified in PTYPE (e.g., '4' octets for an IPv4 address).

At 450, operation (OPER) is to specify the operation of message 400, such as '1' for an ARP request or '2' for an ARP reply. The payload of ARP message 400 may include four addresses, i.e., the hardware and protocol addresses of both the source and destination. At 460 and 470, source hardware address (SHA) is to specify the source MAC address, and source protocol address (SPA) to specify the source IP address. At 480 and 490, target hardware address (THA) is to specify the destination MAC address and target protocol address (TPA) to specify the destination IP address.

As will be described with reference to FIG. 5 and FIG. 6, example process 200 may be implemented by hypervisor 120 to modify the source MAC address of an ARP request message (e.g., specified in SHA field 460) before forwarding it to access switch 150. In particular, the source MAC address may be modified from a MAC address associated with virtual machine 110 (e.g., MAC-VM-11) to a shared MAC address (e.g., MAC-UP1). Using the shared MAC address in the ARP request message, the number of MAC addresses that need to be learned by access switch 150/core switch 160 may be reduced.

Figure 5:
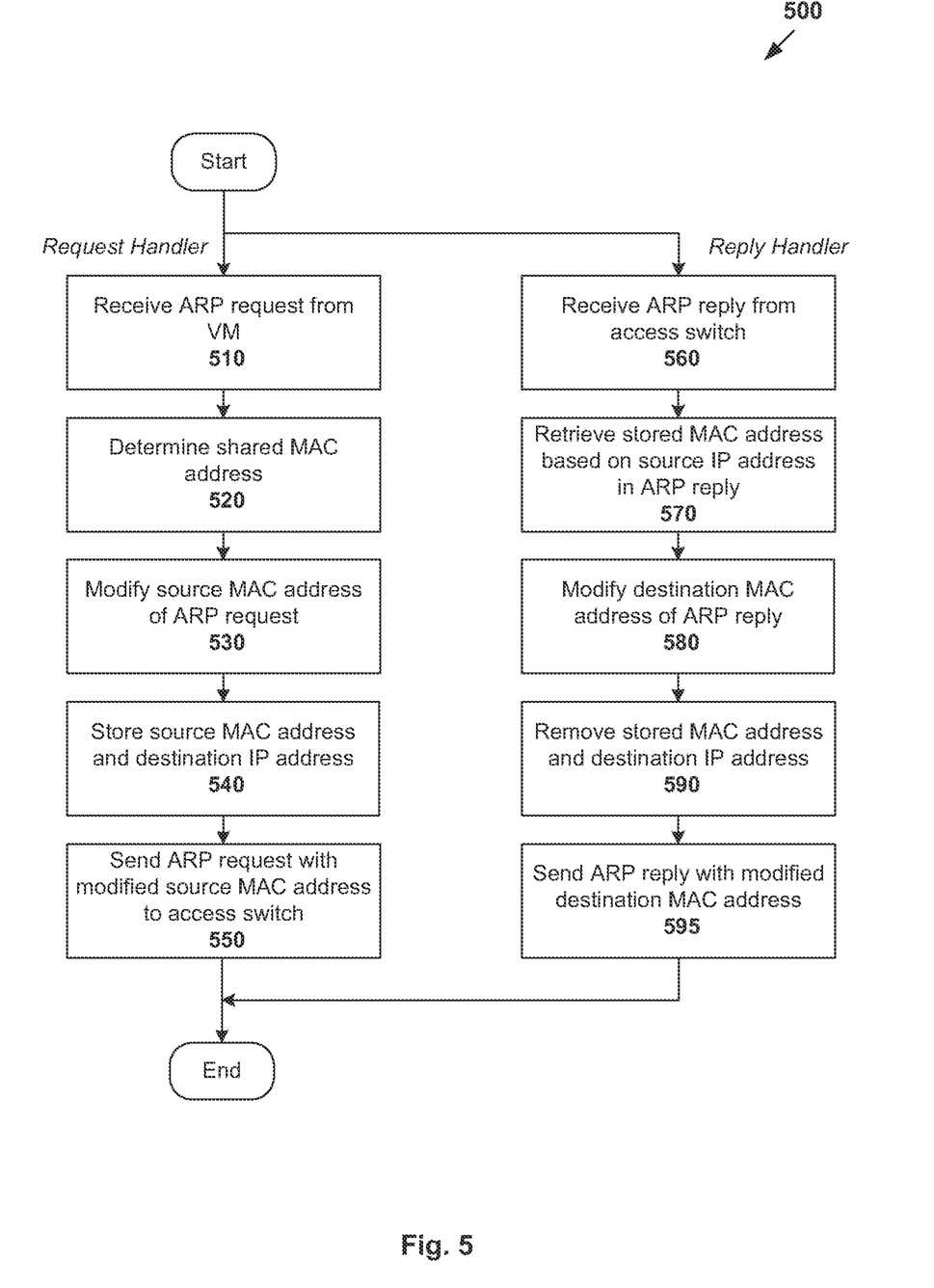
FIG. 5 is a flow chart illustrating an example process for MAC address table protection when forwarding ARP messages.

In more detail, FIG. 5 is a flow chart illustrating example process 500 for MAC address table protection when forwarding ARP messages. FIG. 5 will be explained with reference to FIG. 6, which is a message flow diagram illustrating example communication 600 in example virtualized computing environment 100 in FIG. 1 when example process 500 in FIG. 5 is implemented. The example operations, functions, or actions (e.g., 510 to 595 in FIG. 5, and 610 to 680 in FIG. 6) may be combined, divided, and/or eliminated based upon the desired implementation. In the example shown, example process 500 is implemented by hypervisor 120 using request handler 126, reply handler 128 and address table 129.

At 510 in FIG. 5 (related to 202 and 210 in FIG. 2), request handler 126 receives an ARP request message from virtual machine 110 (e.g., VM-11) via virtual switch 122. The ARP request message is to translate an IP address of a device (e.g., IP-A) to a MAC address (e.g., MAC-A). An example ARP request message is shown at 610 in FIG. 6, which specifies source MAC address=MAC-VM-11; destination MAC address=FF:FF:FF:FF:FF:FF (broadcast MAC address); and destination IP address to be translated=IP-A.

At 520 and 530 in FIG. 5 (related to 220 and 230 in FIG. 2), request handler 126 determines a shared MAC address and modifies the source MAC address (e.g., MAC-VM-11) in the ARP request message to the shared MAC address. For example, request handler 126 may select uplink interface 132 (e.g., UP1) for forwarding the ARP request message to access switch 150, and sets the MAC address of the selected uplink interface (e.g., MAC-UP1) to be the shared MAC address. Since the same uplink interface 132 (e.g., UP1) may be used for at least one other virtual machine 110 (e.g., VM-12), the MAC address of uplink interface 132 (e.g., MAC-UP1) may be shared among multiple virtual machines 110. The selection of uplink interface (e.g., UP1) may be based on any suitable criteria, such as the load of each uplink interface.

At 540 in FIG. 5, request handler 126 stores the destination IP address (e.g., IP-A) in the ARP request message in association with the (original) source MAC address (e.g., MAC-VM-11). In the example in FIG. 6 at 620, a new table entry [IP-A, MAC-VM-11] is stored in address table 129 of protection engine 124. At 550 in FIG. 5 (related to 240 in FIG. 2), request handler 126 sends the ARP request message with the modified source MAC address (e.g., MAC-UP1) to access switch 150. See also 630 in FIG. 6.

Next, access switch 150 receives the ARP request message having the modified source MAC address. Access switch 150 examines the source address (e.g., SHA field 460) in the ARP request message to learn the shared MAC address (e.g., MAC-UP1) instead of the MAC address of virtual machine 110 (e.g., MAC-VM-11). The shared MAC address (e.g., MAC-UP1) may be stored in MAC address table 152 before forwarding the ARP request message. Although not shown in FIG. 6, core switch 160 may similarly learn the shared MAC address (e.g., MAC-UP1) if it is not already stored in MAC address table 162 before forwarding the ARP request on. Since the ARP request message is a broadcast message, is should reach the destination device (e.g., Device A) in due course.

When received, the destination device (Device A) will respond with an ARP reply message if the destination IP address (e.g., IP-A) in the ARP request message matches with its IP address. In the example in FIG. 6, the ARP reply message is indicated at 650 with source MAC address=MAC-A, destination MAC address=MAC-UP1 and source IP address=IP-A. This is to inform virtual machine 110 (VM-11) of the MAC address (e.g., MAC-A) corresponding to the IP address (e.g., IP-A) in the ARP request message. At 660 in FIG. 6, the ARP reply message reaches access switch 150, which relies on the learned MAC-UP1 to forward the ARP reply message to hypervisor 120.

At 560 in FIG. 5 (related to 270 in FIG. 2), reply handler 128 receives the ARP reply message from access switch 150 via virtual switch 122. Since the ARP reply message is a reply to the ARP request message, the destination MAC address (e.g., MAC-UP1) in the ARP reply message is the same as the source MAC address in the ARP request message.

At 570 in FIG. 5, reply handler 128 retrieves a MAC address (e.g., MAC-VM-11) associated with the source IP address (e.g., IP-A) in the ARP reply message from address table 129. This may involve matching the source IP address (e.g., IP-A) in the ARP reply message with the previously stored destination IP address (e.g., IP-A) in the ARP request message. In the example in FIG. 6, IP-A in the entry [IP-A, MAC-VM-11] stored in address table 129 matches with the source IP address in the ARP reply message.

At 580 in FIG. 5, reply handler 128 modifies the destination MAC address in the ARP reply message from the shared MAC address (e.g., MAC-UP1) to the MAC address (e.g., MAC-VM-11) retrieved from address table 129. At 590 in FIG. 5, since the ARP reply message has been received, address table 129 may then updated to remove the matched table entry (e.g., [IP-A, MAC-VM-11]). See also 670 in FIG. 6.

At 595 in FIG. 5 (related to 280 in FIG. 2), reply handler 128 sends the ARP reply message with the modified destination MAC address (e.g., MAC-VM-11 in place of MAC-UP1) to virtual machine 110 (e.g., VM-11). Based on the ARP reply message, virtual machine 110 is able to learn the MAC address of device A (e.g., MAC-A) for subsequent communication.

Figure 6:
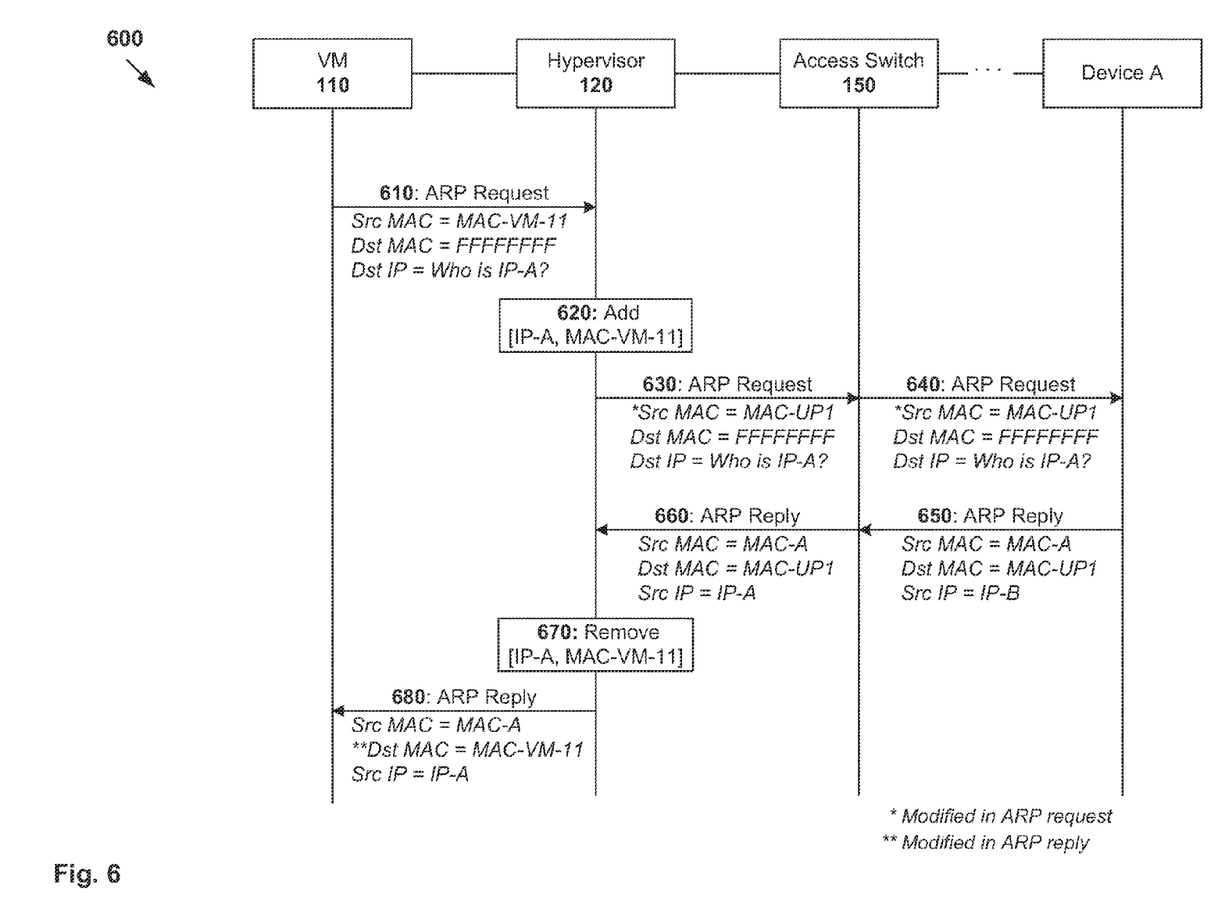
FIG. 6 is a message flow diagram illustrating an example communication in the example virtualized computing environment in FIG. 1 when the example process in FIG. 5 is implemented.

Although an example is shown in FIG. 6, address table 129 may have multiple entries, such as [IP-A, MAC-VM-11] and [IP-A, MAC-VM-12]. In this case, VM-11 and VM-12 have each sent an ARP request message to translate IP-A into its corresponding MAC address. Since there are multiple entries associated with IP-A, reply handler 128 may send the ARP reply message to both VM-11 and VM-12. Both entries may then be removed from address table 129 at block 590 in FIG. 9.

Although address table 129 is used to store associations between MAC addresses and IP addresses, the likelihood of address table 129 reaching its size limitation is relatively low compared to MAC address table 152/162 of access switch 150 or core switch 160. This is because the number of vNICs (see 118 in FIG. 3 again) connected to virtual switch 122 is generally limited (e.g., up to 1024 vNICs). Since address table 129 is configurable, its size may be configured based on the number of maximum vNICs (e.g., up to 1024 table entries). In contrast, access switch 150 is generally connected to significantly more virtual machines supported by multiple hosts 140. Further, core switch 160 is connected to multiple access switch 150.

DHCP Messages

Example process 200 in FIG. 2 may be implemented by hypervisor 120 when forwarding DHCP messages from virtual machine 110. In general, DHCP is a protocol for a DHCP server to dynamically distribute IP configuration parameters (e.g., IP address) to a DHCP client. Other configuration parameters may include a subnet mask, a default gateway, Domain Name Service (DNS) server addresses, etc. In the following examples, the DHCP client may be virtual machine 110, such as VM-11 with MAC address MAC-VM-11. The DHCP server may be any suitable device, which may be implemented by another virtual machine (e.g., VM-21) or a device on another network (not shown in FIG. 1 for simplicity). In the following, the MAC address and IP address of the DHCP server (S) will be denoted as "MAC-S" and "IP-S" respectively.

DHCP operations generally fall into four phases: (1) the DHCP client performing DHCP server discovery by sending a DHCP Discover message; (2) the DHCP server performing IP lease offer by sending a DHCP Offer message; (3) the DHCP client accepting the offer by sending a DHCP Request message; and (4) the DHCP server returns a DHCP Acknowledgement (ACK) or Negative Acknowledgement (NACK) message to the DHCP client. The DHCP Discover, DHCP Offer, DHCP Request and DHCP ACK/NACK messages generally have the same message format, except that some fields have different values.

Figure 7:
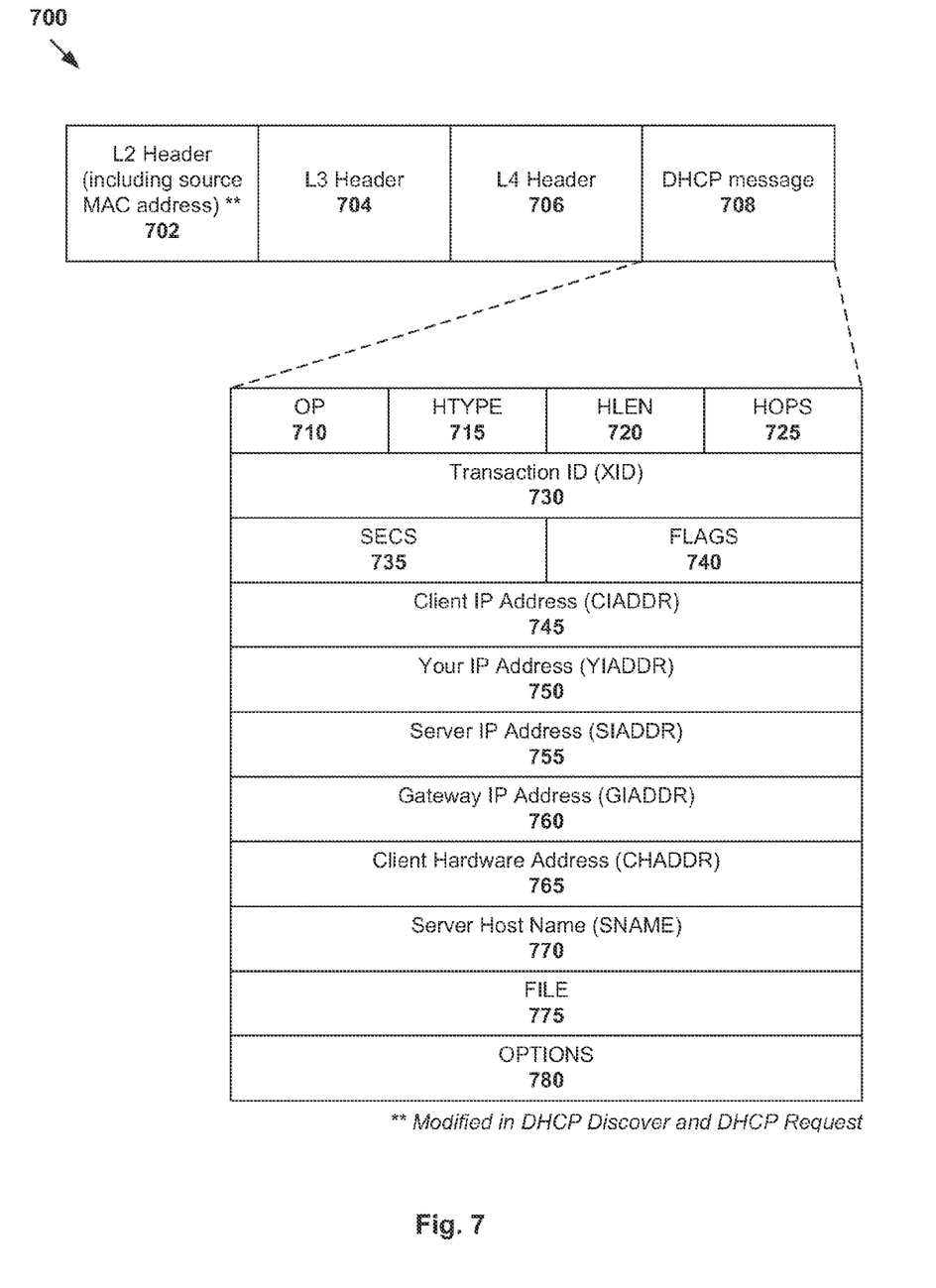
FIG. 7 is a schematic diagram of an example format of a Dynamic Host Configuration Protocol (DHCP) message.

FIG. 7 is a schematic diagram of an example format 700 of DHCP message. DHCP message 708 is encapsulated with various headers, such as a layer 2 (L2) header 702 (e.g., Ethernet or MAC header); layer 3 (L3) header (e.g., IP header); and layer 4 (L4) header (e.g., User Datagram Protocol (UDP) header). L2 header 702 generally includes a source MAC address and a destination MAC address, while L3 header 704 includes a source IP address and a destination IP address. Although an example is shown, any other suitable format having additional or alternative fields may be used.

At 710 in FIG. 7, DHCP message 708 further includes OP code is to specify a message type, such as 1=request message and 2=reply message. At 715 and 720 in FIG. 7, hardware type (HTYPE) is to specify the hardware address type (e.g., 1=MAC address) and hardware length (HLEN) to specify the address length (e.g., 6 octets). At 725 in FIG. 7, HOPS is to specify the number of relay agents a request message has travelled. At 730 in FIG. 7, Transaction ID (XID) is to specify a random number chosen by the DHCP client and used by both the DHCP client and DHCP server to associate messages between them.

At 735 in FIG. 7, seconds (SECS) is to specify the number of seconds elapsed since the address acquisition or renewal process begins. At 740 in FIG. 7, FLAGS is to specify various flags, such as a broadcast (B) flag. At 745 in FIG. 7, client IP address (CIADDR) is to specify the IP address of the DHCP client. At 750 in FIG. 7, 'your' IP address (YIADDR) is the IP address assigned by the DHCP server to the DHCP client. At 755 in FIG. 7, server IP address (SIADDR) is to specify the IP address of the DHCP server (e.g., IP-S).

At 760 in FIG. 7, gateway IP address (GIADDR) is to specify the IP address of a relay agent (not shown for simplicity in FIG. 1). At 765 in FIG. 7, client hardware address (CHADDR) is the MAC address (e.g., MAC-VM-11) of the DHCP client (e.g., VM-11). At 770 in FIG. 7, server host name (SNAME) is to specify an optional server host name. At 775 and 780 in FIG. 7, FILE is to specify any boot file name, and OPTIONS to specify any optional parameter field. For example, OPTIONS 780 may be used to specify the message type, e.g., DHCP Discover, DHCP Offer, DHCP Request, DHCP ACK/NACK, etc.

As will be described with reference to FIG. 8 and FIG. 9, example process 200 may be implemented by hypervisor 120 to modify the source MAC address in L2 header 702 of a DHCP Discover or DHCP Request message before forwarding the message to access switch 150. In particular, the source MAC address may be modified from a MAC address associated with virtual machine 110 (e.g., MAC-VM-11) to a shared MAC address (e.g., MAC-UP1). Using the shared MAC address, the number of MAC addresses that need to be learned by access switch 150/core switch 160 may be reduced.

Figure 8:
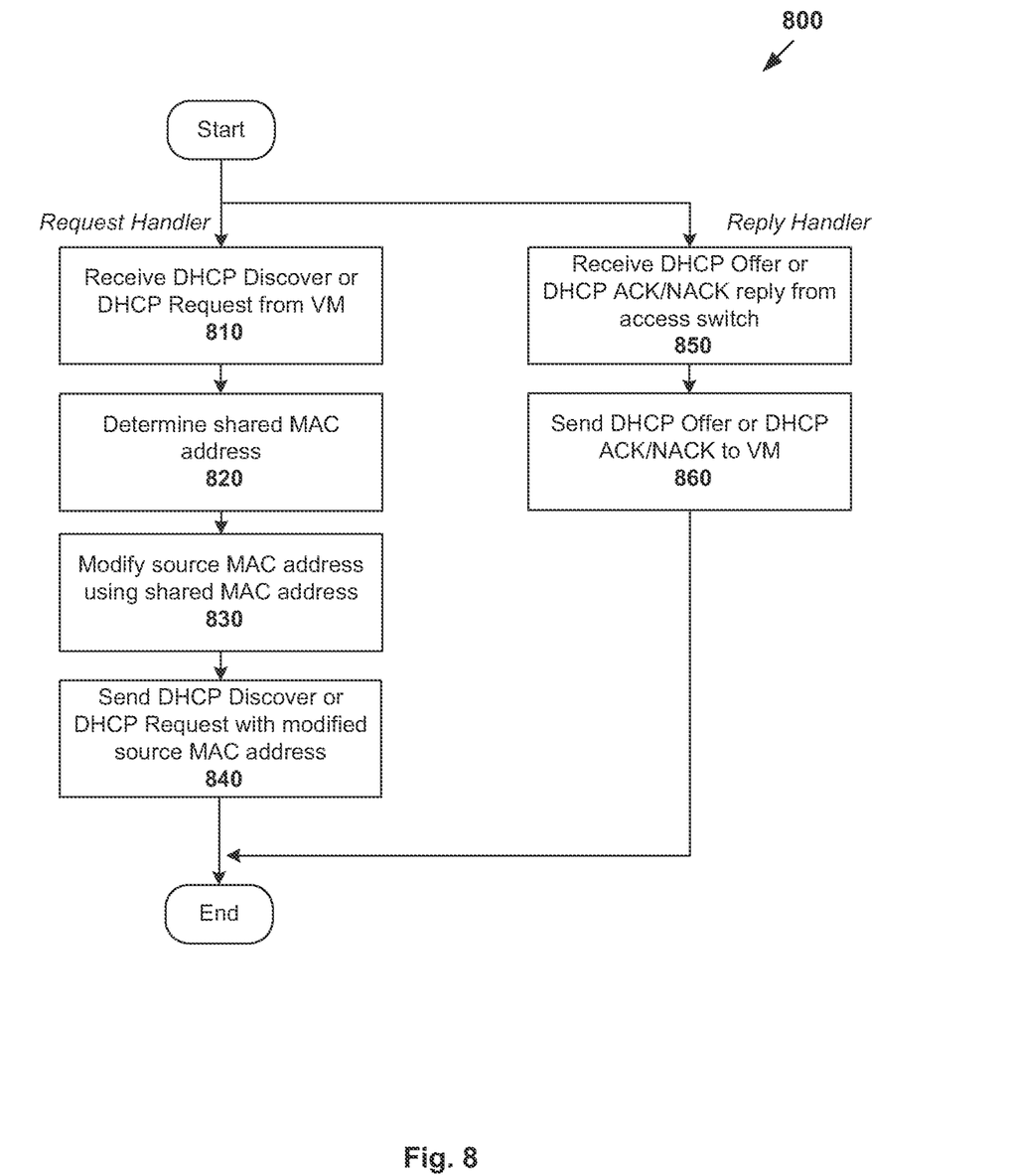
FIG. 8 is a flow chart illustrating an example process for MAC address table protection when forwarding DHCP messages.
Figure 9:
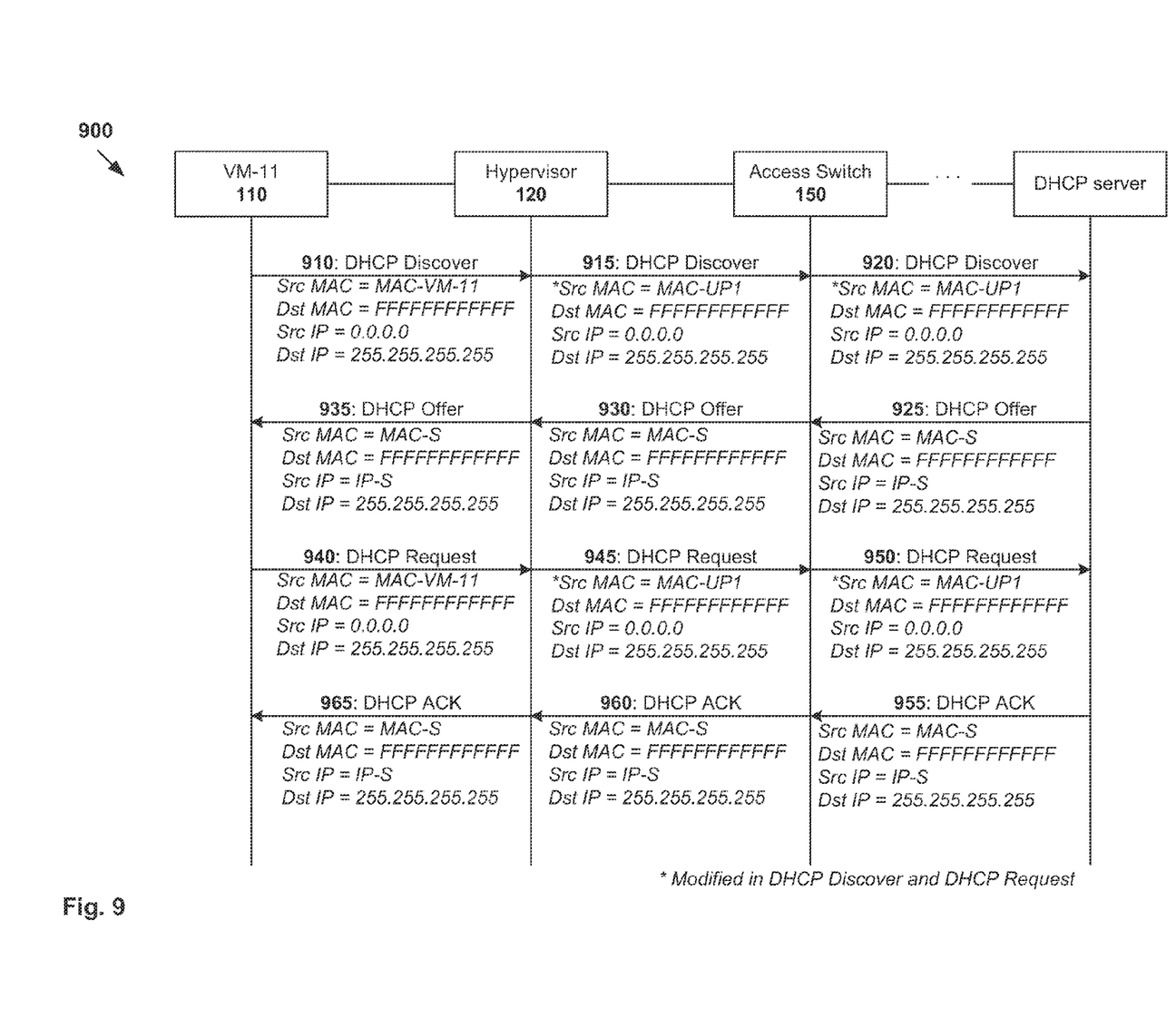
FIG. 9 is a message flow diagram illustrating an example communication in the example virtualized computing environment in FIG. 1 when the example process in FIG. 8 is implemented.

Compared to FIG. 5 and FIG. 6, the DHCP server in the examples in FIG. 8 and FIG. 9 may send the DHCP Offer and DHCP ACK/NACK messages as broadcast messages (instead of unicast messages as in the case of ARP reply messages). In this case, it is not necessary for hypervisor 120 to store the destination IP address=255.255.255.255 in the DHCP Discover and Request messages in address table 129. Since the DHCP Offer and DHCP ACK/NACK messages are broadcasted to destination IP address=255.255.255.255, it is not necessary to modify the destination MAC address in L2 header 702 of the DHCP Offer and DHCP ACK/NACK messages.

In more detail, FIG. 8 is a flow chart illustrating example process 800 for MAC address table protection when forwarding DHCP messages. FIG. 8 will be explained with reference to FIG. 9, which is a message flow diagram illustrating example communication 900 in example virtualized computing environment 100 in FIG. 1 when example process 800 in FIG. 8 is implemented. The example operations, functions, or actions (e.g., 810 to 860 in FIG. 8, and 910 to 965 in FIG. 9) may be combined, divided, and/or eliminated based upon the desired implementation. In the example shown, example process 800 is implemented by hypervisor 120 using request handler 126 and reply handler 128 of protection engine 124.

(1) DHCP Discover Message

At 810 in FIG. 8 (related to 202 and 210 in FIG. 2), request handler 126 receives a DHCP Discover message from virtual machine 110 (e.g., VM-11). In the example in FIG. 9, the DHCP Discover message at 910 is a broadcast message with OP=1 to indicate a request message, source MAC address=MAC-VM-11, destination MAC address=FF:FF:FF:FF:FF:FF (broadcast MAC address), source IP address=0.0.0.0 and destination IP address=255.255.255.255 (broadcast IP address). As explained using FIG. 7, the source MAC address (e.g., MAC-VM-11) is generally specified in L2 header 702 (see FIG. 7).

At 820 and 830 in FIG. 8 (related to 220 and 230 in FIG. 2), request handler 126 determines a shared MAC address and modifies the source MAC address in L2 header 702 of the DHCP Discover message from the MAC address associated with virtual machine 110 (e.g., MAC-VM-11) to the shared MAC address. Similar to the ARP examples, the shared MAC address may be a MAC address of uplink interface 132 (e.g., MAC-UP1 of UP1) that is selected for sending the DHCP Discover message to access switch 150. At 840 in FIG. 8 (related to 240 in FIG. 2), the DHCP Discover message is sent to access switch 150.

In the example in FIG. 9, the DHCP Discover message at 915 has a modified source MAC address=MAC-UP1 (i.e., shared MAC address). Once the DHCP Discover message is received, access switch 150 may learn the source MAC address=MAC-UP1 if the address has not been previously stored in MAC address table 152. At 920, the DHCP Discover message is forwarded to the DHCP server. Although not shown in FIG. 9 for simplicity, the DHCP Discover message may be forwarded via core switch 160, which may also store the source MAC address=MAC-UP1 in MAC address table 162.

(2) DHCP Offer Message

In reply to the DHCP Discover message, the DHCP server broadcasts a DHCP Offer message. In the example in FIG. 9, the DHCP Offer message is a broadcast message with OP=2 indicating a reply message, source MAC address=MAC-S, destination MAC address=FF:FF:FF:FF:FF:FF, source IP address=IP-S and destination IP address=255.255.255.255.

The DHCP Offer message may also include configuration parameters, with the YIADDR field (750 in FIG. 7) populated with an IP address (e.g., IP-VM-11) the DHCP server is offering to the DHCP client (e.g., VM-11). At 935 in FIG. 9, access switch 150 receives the DHCP Offer message and broadcasts the DHCP Offer message to its connecting hosts 140.

At 850 and 860 in FIG. 8 (related to 250 and 260 in FIG. 2), reply handler 128 receives the DHCP Offer message, and sends the DHCP Offer message as a broadcast message. In the example in FIG. 9, the DHCP client (e.g., VM-11) receives the DHCP Offer message at 935. Although FIG. 9 shows the DHCP client (e.g., VM-11) receiving one DHCP Offer message, there may be multiple DHCP servers responding to the DHCP Discover message of the DHCP client. In this case, the DHCP client (e.g., VM-11) may select one of the offers and respond with a DHCP Request message.

(3) DHCP Request Message

Request handler 126 may repeat blocks 810, 820, 830 and 840 to process a DHCP Request message. In the example in FIG. 9, the DHCP Request message (see 940) is a broadcast message with OP=1 indicating a request message, source MAC address=MAC-VM-11, destination MAC address=FF:FF:FF:FF:FF:FF, source IP address=0.0.0.0 and destination IP address=255.255.255.255.

Similarly, the source MAC address is modified from the MAC address of the DHCP client (e.g., VM-11) to a shared MAC address (e.g., MAC-UP1) associated with uplink interface 132 (e.g., UP1) selected for sending the DHCP Request message. At 945 and 950 in FIG. 9, the DHCP Request message with the modified source MAC address is sent to the DHCP server via access switch 150. Again, since a shared MAC address (e.g., MAC-UP1) is used, MAC address table 152 at access switch 150 will not be populated with the MAC address of different virtual machines 110 (e.g., MAC-VM-11, MAC-VM-12, etc.).

The DHCP Request is broadcasted to let one DHCP server know that the DHCP client (e.g., VM-11) is accepting its offer. If more than one DHCP Offer message is received, the DHCP Request is also to reject the offer from at least one other DHCP server.

(4) DHCP ACK/NACK Message

Reply handler 128 may repeat blocks 850 and 860 to process a DHCP ACK or NACK message from the DHCP server. In the example in FIG. 9, the DHCP ACK/NACK message is a broadcast message with OP=2 indicating a reply message, source MAC address=MAC-S, destination MAC address=FF:FF:FF:FF:FF:FF, source IP address=IP-S and destination IP address=255.255.255.255. See 955, 960 and 965 in FIG. 9.

The DHCP ACK message is to inform the DHCP client (e.g., VM-11) that the assignment of the IP address in the YIADDR field (750 in FIG. 7) has been successful. Otherwise, the DHCP NACK message is to inform the DHCP client (e.g., VM-11) that the assignment has been unsuccessful, which may occur if the DHCP server reassigns the same IP address to another DHCP client after sending the DHCP Offer message.

Although the examples in FIG. 8 and FIG. 9 illustrate the DHCP Offer and DHCP ACK/NACK messages as broadcast messages, it will be appreciated that they may be sent as unicast messages in practice. In this case, instead of broadcasting the DHCP Offer and DHCP ACK/NACK messages, the DHCP server may set their destination MAC address to be the MAC address associated virtual machine 110 (e.g., MAC-VM-11), which may be found in CHADDR field 765 (see FIG. 7) in the DHCP Discover and DHCP Request messages. Reply handler 860 may then forward the DHCP Discover and DHCP Request messages to virtual machine (e.g., VM-11).

The above examples can be implemented by hardware (including hardware logic circuitry), software or firmware or a combination thereof. For example, host 140 may be implemented by any suitable network device, which may include processor and memory that may communicate with each other via a bus, etc. The network device may include a non-transitory computer-readable medium having stored thereon instructions that, when executed by the processor, cause the processor to perform processes described herein with reference to FIG. 1 to FIG. 9.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or firmware to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) notifyation in a form accessible by a machine (e.g., a computer, network device, personal digital assistant (PDA), mobile device, manufacturing tool, any device with a set of one or more processors, etc.). For example, a computer-readable storage medium includes recordable/non recordable media (e.g., read-only memory (ROM), random access memory (RAM), magnetic disk storage media, optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

I claim:

1. A method for a network device to protect a Media Access Control (MAC) address table of a network switch connecting to the network device in a virtualized computing environment, the method comprising:
   in response to receiving a packet from a virtual machine with a MAC address supported by the network device:
   when the packet includes a request message, wherein the request message is one of an Address Resolution Protocol (ARP) request message, a Dynamic Host Configuration Protocol (DHCP) discover message, or a DHCP request message,
      determining a shared MAC address that is usable for the virtual machine and at least one other virtual machine supported by the network device;
      modifying a source MAC address of the request message from the MAC address to the shared MAC address before the request message reaches the network switch; and
      sending, to the network switch, the request message having the shared MAC address as the modified source MAC address;
   when the packet does not include the request message, sending, to the network switch, the packet without modifying a source MAC address associated with the packet; and
   in response to receiving a reply message in reply to the request message in a second packet from the network switch, the reply message having the shared MAC address as a destination MAC address, sending, to the virtual machine, the reply message.

2. The method of claim 1, wherein determining the shared MAC address comprises:
   selecting an uplink interface from multiple uplink interfaces of the network device that connect the virtual machine and the at least one other virtual machine to the network switch; and
   setting a MAC address associated with the selected uplink interface to be the shared MAC address.

3. The method of claim 2, wherein sending the request message comprises:
   sending, via the selected uplink interface to the network switch, the request message with the MAC address of the selected uplink interface as the modified source address.

4. The method of claim 1, wherein in response to receiving the packet that includes the request message, the method further comprises:
   determining a destination Internet Protocol (IP) address of the request message; and
   storing the destination IP address of the request message in association with the MAC address associated with the virtual machine.

5. The method of claim 4, wherein in response to receiving the reply message, the method further comprises:
   matching a source IP address of the reply message with the stored destination IP address of the request message;
   modifying a destination MAC address of the reply message from the shared MAC address to the stored MAC address associated with the virtual machine; and
   removing the stored destination IP address of the request message and the stored MAC address associated with the virtual machine.

6. The method of claim 5, wherein sending the reply message to the virtual machine comprises:
   sending the reply message as a unicast message to the virtual machine at the MAC address associated with the virtual machine.

7. The method of claim 6, wherein the request message is the ARP request message having a broadcast MAC address as a destination MAC address, and the reply message is an ARP reply message.

8. The method of claim 3, wherein the request message is the DHCP discover message or the DHCP request message; and the reply message is a DHCP offer message in reply to the DHCP discover message, or a DHCP acknowledgement (ACK) or negative acknowledgement (NACK) message in reply to the DHCP request message.

9. The method of claim 1, wherein the network device includes a hypervisor implementing a virtual switch via which the request message and reply message are received and sent, and a protection engine comprising:
   a request handler to receive the request message from the virtual machine, to determine the shared MAC address, to modify the source MAC address, and to send the request message with the modified source address to the network switch; and
   a reply handler to receive the reply message from the network switch and to send the reply message to the virtual machine.

10. The method of claim 9, wherein the network switch is an access switch connecting to the network device, or a core switch connecting to the network device via the access switch.

11. A non-transitory computer-readable storage medium that includes a set of instructions which, in response to execution by a processor of a network device, cause the processor to perform a method of protecting a Media Access Control (MAC) address table of a network switch connecting to the network device in a virtualized computing environment, the method comprising:
  in response to receiving a packet from a virtual machine with a MAC address supported by the network device:
  when the packet includes a request message, wherein the request message is one of an Address Resolution Protocol (ARP) request message, a Dynamic Host Configuration Protocol (DHCP) discover message, or a DHCP request message,
    determining a shared MAC address that is usable for the virtual machine and at least one other virtual machine supported by the network device;
    modifying a source MAC address of the request message from the MAC address to the shared MAC address before the request message reaches the network switch; and
    sending, to the network switch, the request message having the shared MAC address as the modified source MAC address;
  when the packet does not include the request message, sending, to the network switch, the packet without modifying a source MAC address associated with the packet; and
  in response to receiving a reply message in reply to the request message from the network switch, the reply message having the shared MAC address as a destination MAC address, sending, to the virtual machine, the reply message.

12. The non-transitory computer-readable storage medium of claim 11, wherein determining the shared MAC address comprises:
  selecting an uplink interface from multiple uplink interfaces of the network device that connect the virtual machine and the at least one other virtual machine to the network switch; and
  setting a MAC address associated with the selected uplink interface to be the shared MAC address.

13. The non-transitory computer-readable storage medium of claim 12, wherein sending the request message comprises:
  sending, via the selected uplink interface to the network switch, the request message with the MAC address of the selected uplink interface as the modified source address.

14. The non-transitory computer-readable storage medium of claim 11, wherein in response to receiving the packet that includes the request message, the method further comprises:
  determining a destination Internet Protocol (IP) address of the request message; and
  storing the destination IP address of the request message in association with the MAC address associated with the virtual machine.

15. The non-transitory computer-readable storage medium of claim 14, wherein in response to receiving the reply message, the method further comprises:
  matching a source IP address of the reply message with the stored destination IP address of the request message;
  modifying a destination MAC address of the reply message from the shared MAC address to the stored MAC address associated with the virtual machine; and
  removing the stored destination IP address of the request message and the stored MAC address associated with the virtual machine.

16. The non-transitory computer-readable storage medium of claim 15, wherein sending the reply message to the virtual machine comprises:
  sending the reply message as a unicast message to the virtual machine at the MAC address associated with the virtual machine.

17. The non-transitory computer-readable storage medium of claim 16, wherein the request message is the ARP request message having a broadcast MAC address as a destination MAC address, and the reply message is an ARP reply message.

18. The non-transitory computer-readable storage medium of claim 13, wherein the request message is the DHCP discover message or the DHCP request message; and the reply message is a DHCP offer message in reply to the DHCP discover message, or a DHCP acknowledgement (ACK) or negative acknowledgement (NACK) message in reply to the DHCP request message.

19. A network device configured to protect a Media Access Control (MAC) address table of a network switch connecting to the network device in a virtualized computing environment, the network device comprising: a processor, multiple uplink interfaces; and a non-transitory computer-readable medium having stored thereon instructions that, when executed by the processor, cause the processor to:
  in response to receiving a packet from a virtual machine with a MAC address supported by the network device:
  when the packet includes a request message, wherein the request message is one of an Address Resolution Protocol (ARP) request message, a Dynamic Host Configuration Protocol (DHCP) discover message, or a DHCP request message,
    determine a shared MAC address that is usable for the virtual machine and at least one other virtual machine supported by the network device;
    modify a source MAC address of the request message from the MAC address to the shared MAC address, wherein the shared MAC address is a MAC address associated with a selected uplink interface from the multiple uplink interfaces; and
    send, via the selected uplink interface to the network switch, the request message having the shared MAC address as the modified source MAC address;
  when the packet does not include the request message, send, to the network switch, the packet without modifying a source MAC address associated with the packet; and
  in response to receiving a reply message in reply to the request message from the network switch via the selected uplink interface, the reply message having the shared MAC address as a destination MAC address, send, to the virtual machine, the reply message.

20. The network device of claim 19, wherein the instructions, when executed by the processor, further cause the processor to implement a hypervisor that includes a virtual switch via which the request message and the reply message are received and sent, and a protection engine comprising:
  a request handler to receive the request message from the virtual machine, to determine the shared MAC address, to modify the source MAC address, and to send the request message with the modified source address to the network switch; and a reply handler to receive the reply message from the network switch and to send the reply message to the virtual machine.

\* \* \* \* \*